Dec. 23, 1941.  T. PETERSEN  2,267,166
THREAD CUTTING TOOL
Filed July 13, 1939  3 Sheets-Sheet 2

Thorvald Petersen
INVENTOR.

BY
ATTORNEYS.

Dec. 23, 1941.                T. PETERSEN                  2,267,166
                          THREAD CUTTING TOOL
                         Filed July 13, 1939          3 Sheets-Sheet 3
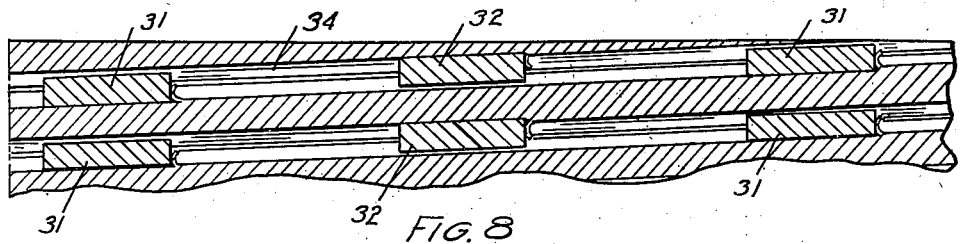
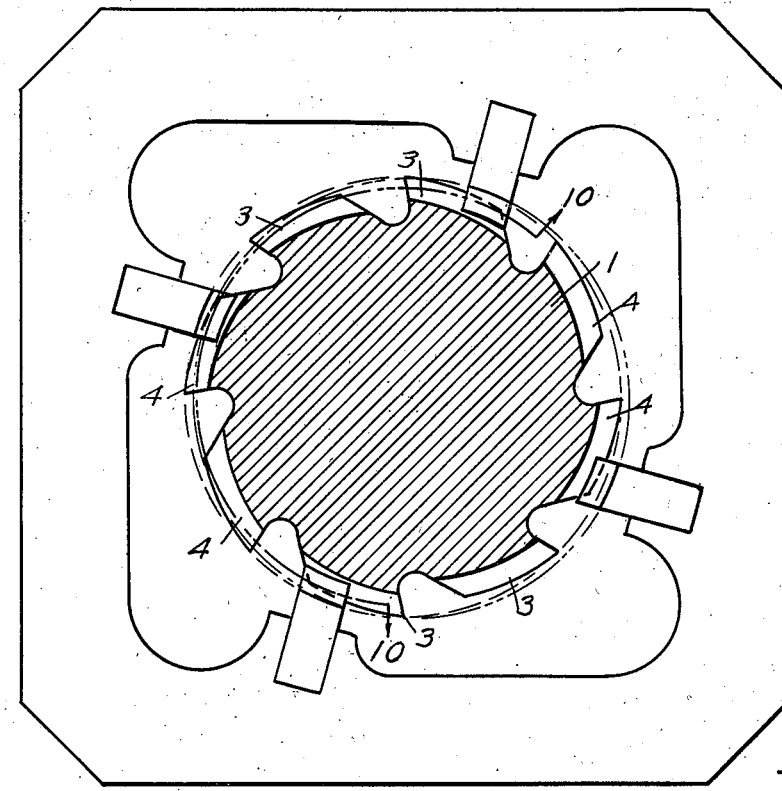
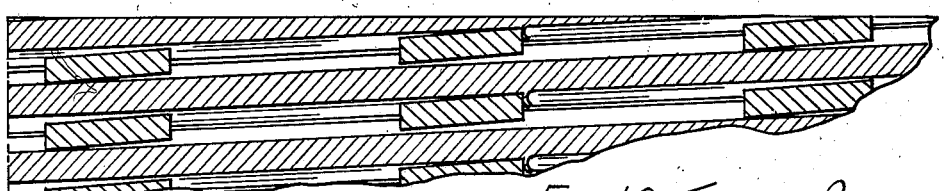
Thorvald Petersen
INVENTOR.
ATTORNEYS.

Patented Dec. 23, 1941

2,267,166

UNITED STATES PATENT OFFICE 2,267,166

THREAD CUTTING TOOL

Thorvald Petersen, Erie, Pa., assignor to Reed Manufacturing Company, Erie, Pa., a corporation of Pennsylvania Application July 13, 1939, Serial No. 284,304

9 Claims. (Cl. 10—111)

In cutting threads it is desirable that the cut may progress with as little friction of the engaging surfaces as possible with clearance for the non-engaged parts of the thread being cut so as to prevent both friction and loading. It is also desirable that the cut may be made from one slope of the thread in the shape of a shaving, surfaces of which are in one plane so that the shaving may readily curl and free itself of the tool as distinguished from a V cut with a V shaped cross section of the shaving which results usually in a breaking of the shaving into very short lengths which adds to the power required to make the cut.

Under some conditions it is advantageous to make the cut along one slope with each cutter but to alternate the cut in succeeding cutting faces to opposite slopes of the thread. It may be desirable in some instances to confine the cutting entirely to one slope throughout the length of the thread. With the present invention these desirable ways may be cheaply and conveniently accomplished. Features and details of the invention will be further set forth in the following description.

Preferred exemplifications of the tools are illustrated in the accompanying drawings.

Fig. 1 shows a finished tap.

Fig. 2 a section on the line 2—2 in Fig. 1.

Fig. 3 a section on the line 3—3 in Fig. 2.

Fig. 4 a section on the line 4—4 in Fig. 2.

Fig. 5 a circumferential section on the line 5—5 in Fig. 2, showing the relative relation of the cutting teeth.

Fig. 8 shows a circumferential section developed on the line 8—8 in Fig. 7, including a section of a pipe thread similarly developed on which the die is acting.

Fig. 9 shows a die in which the cutting tool of Fig. 1 is cutting threads in the die in the manner of forming threads illustrated and described in my prior application, Serial No. 59,049 filed January 14, 1936.

Fig. 10 shows a circumferential section on the line 10—10 in the die shown in Fig. 9 which shows a pipe thread similarly developed and in section being cut by the die shown in Fig. 9.

Figures 1, 2:
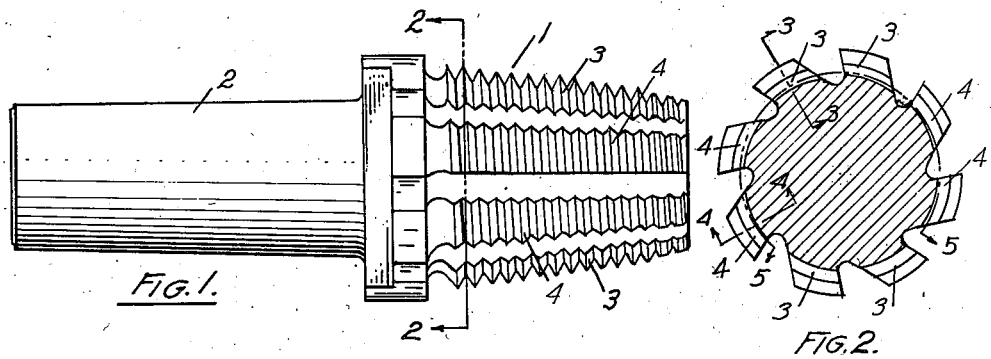

1 marks the finished tap, 2 a shank extending from the tap, 3 teeth cutting on one slope, and 4 teeth cutting on the opposite slope of a thread being formed by the tap. The tap is formed in lands in the usual manner having undercut clearance spaces between the lands giving some rake to the cutting edges. In order to form this tap, the following mechanism and procedure is followed:

5 marks a lathe spindle with a center 5a. A center 7 is carried by the tail stock 6. The blank forming the tap is shown in place in these centers. A dog 8 is secured to the shank and engages a face plate 9. A gear 10 is fixed on the spindle and meshes with an intermediate gear 11. The gear 11 meshes with a gear 12 carried by a spindle 13, these gears being properly mounted in journals carried by the lathe frame. A cam-faced taper attachment 14 is secured in the spindle 13 and is engaged by a bearing 15. This attachment has cam faces 16 which are adapted to operate the cutting tool to form the radial clearance indicated on the teeth in Fig. 2. This radial action changes the inclination of the tooth to the helix of the thread by reason of the tapered edge of the cutting tool. As this moves in and out radially during the cutting across the land, the crest of the thread, at the same time having a substantially uniform arc, is inclined through the radial shift of the bevel to the helix of the thread, thus giving clearance to the entire slope back of the cutting edge. The taper attachment contacts a finger 17 carried by a cross slide 18 of the lathe. The slide is yieldingly drawn toward the attachment by a weight 17a which is connected to the slide by a cable 17b leading over a sheave 17c.

A thread cutting tool 19 is mounted in a tool post 20. The tool post is arranged on a longitudinal slide 21 which is adapted to be adjusted by a screw shaft 22. The cross slide may be adjusted crosswise by a screw shaft 23. A gage 24 on the cross slide engages a stop 25 on the post carrier 21 to indicate the adjustment of the tool axially of the blank being cut. A gage 26 is carried by a cross slide guide 28 and engages a stop 29 on the cross slide thus indicating the radial position of the cutting tool with relation to the axis of the blank.

In carrying out the operation a thread is cut in the blank in the ordinary manner of cutting a thread on a lathe. This thread is cut to depth. Upon the completion of this thread the cutting tool is offset through the adjustment of the tool carrier 21 a few thousandths of an inch and one slope of the teeth 3 is cut by carrying the tool forward into cutting position for the two teeth of each pair on the top and then retracting the tool so as to clear the succeeding pair of teeth. This cutting action is repeated until the desired offsetting of this slope is accomplished. The cutting tool is then adjusted in the opposite direction through the adjustment of the tool carrier 21 and the tool is then fed forward engaging a slope of the teeth 4. The same operation is repeated with relation to these pairs of teeth as was performed in cutting the slope of the teeth 3.

Figure 3:
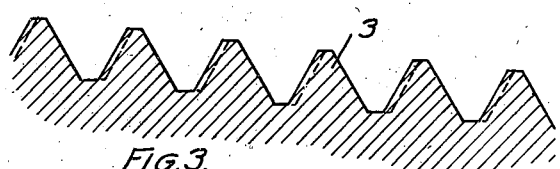
Figure 4:
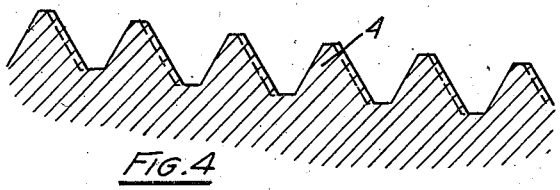
Figure 5:
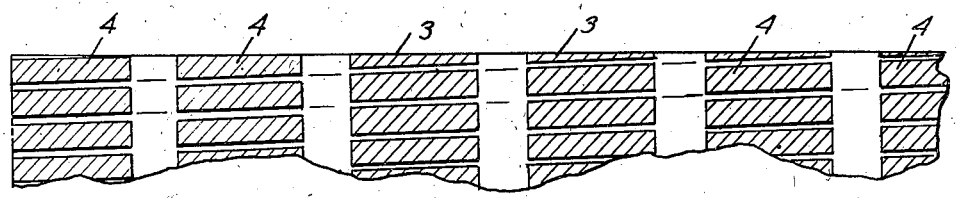
Figure 6:
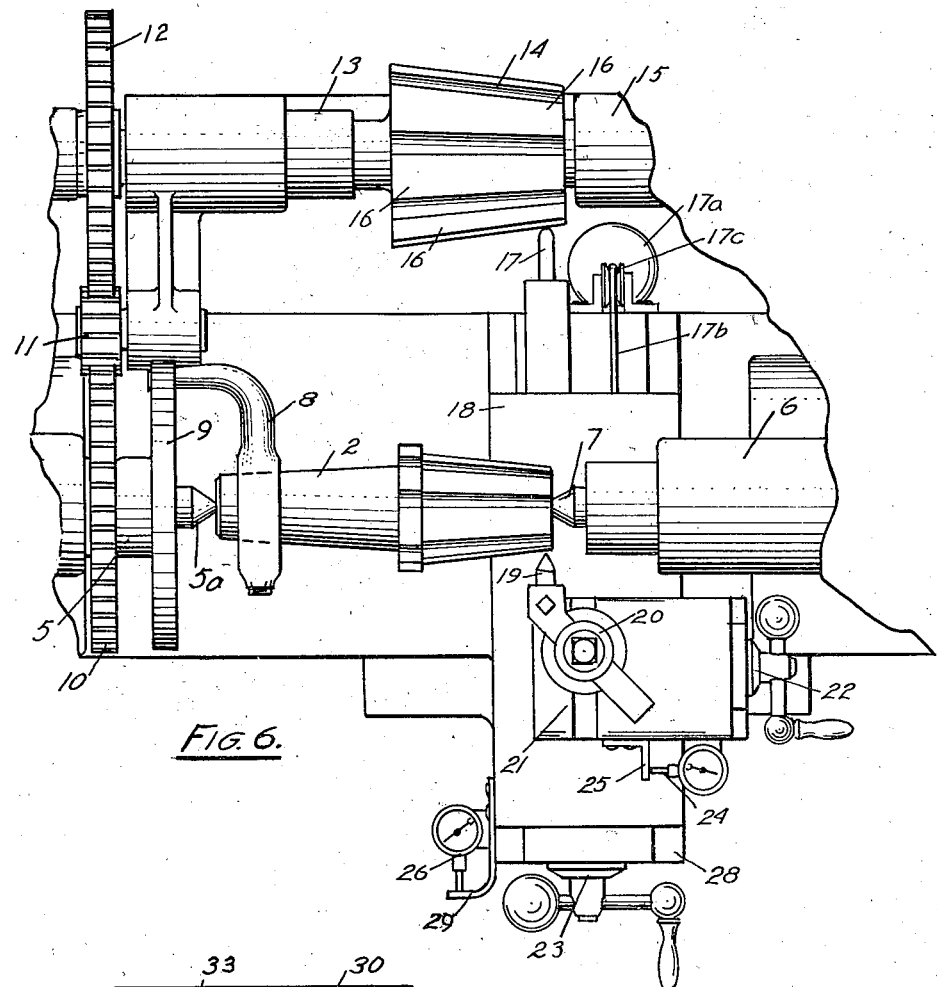
Fig. 6 shows a plan view of a lathe in which a tap is being formed.

In Figs. 3 and 4 sections of the blank are shown at the completion of the first and normal thread cutting operation in full lines. The dotted lines show the completed cut in these sections. After the tap is so completed the pairs of teeth are offset axially as indicated in Fig. 5, this offsetting, as shown, being exaggerated.

It will be understood that these cutting teeth are not necessarily formed in pairs. They may be formed by single teeth alternately arranged. If this tap is used merely as a tap, it will cut the thread by alternately cutting opposite slopes with succeeding teeth. Thus each cut is confined to one slope and the cutting thrusts of the opposite slopes are in effect balanced.

Figure 7:
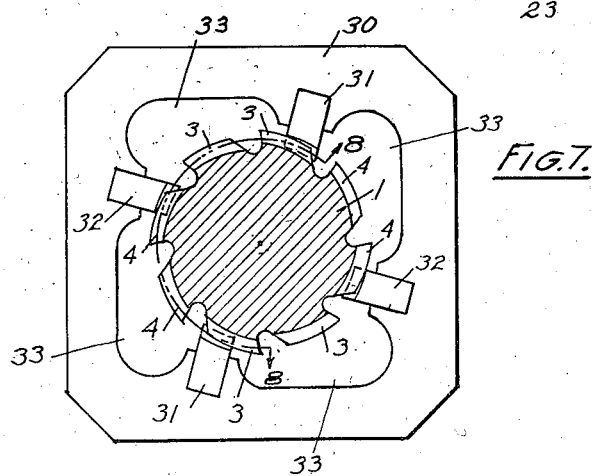
Fig. 7 is a view showing a die and the cutter illustrated in Fig. 2 in place in cutting the teeth of the die.

This tap may be used to form a die having the same peculiarities as the tap. Such a die is shown in Fig. 7, the die 30 having chasers 31 and 32 with clearance spaces 33 between the chasers. The tap is advanced into this die completing the cut with each pair of cutting faces in a clearance space. With this thread so completed, the tap is backed off and it will be found that the die has its threads offset so as to cut alternately on opposite slopes with succeeding chasers. The cutting sequence is shown in Fig. 8 which is a circumferential section on the line 8—8 in Fig. 7. A pipe thread 34 similarly developed as the die teeth is shown in section corresponding in the slope to the section of the die teeth.

The threading teeth may be formed having an inclination to the angle of the helix in the manner of the die shown in my before-mentioned application Serial No. 59,049 in which case the cutting teeth operate on one slope and the guiding teeth on the opposing slope.

Such a manner of using the tap in forming a die is illustrated in Fig. 9. Here it will be noted that the tap is of smaller diameter than the finished die and that two chasers are formed by offsetting the tap relatively to the center of the die and two chasers formed by reversing the offsetting as fully described in my previous application. Where this is done the inclination of the threads in the die will be inclined to the pipe threads cut by the die.

The circumferential sectional development of the die teeth on the line 10—10 shown in Fig. 10 indicates the relation of the teeth to the thread cut. Here it will be noted that alternate teeth operate as cutting teeth and guide teeth. The cutting teeth are inclined giving clearance back of the cutting edge and the guide teeth have a slope so that only the rear edge of the guide teeth contact the thread being cut.

In all the structures of the present invention there is formed a clearance space as to each cutting tooth opposite the cutting slope of that tooth and where the guiding teeth are provided there is also a clearance space between the slope of each guiding tooth opposite the crowding or guiding slope. This clearance space in the present invention is definitely controlled and is sufficient to prevent what is ordinarily termed loading of the die, that is, the inclusion and wiping in of metal particles between engaging surfaces.

The present cutting tool, therefore, reduces the resistance frictional and otherwise to the advancing of the cutting tool. It forms a chip from one slope only and in this way reduces the pressure over those types of tools which cut a V-shaped chip and it reduces the frictional engagement and loading possibilities to a minimum thus confining the resistance very largely to the resistance incident to cutting. Its principal advantage is in cutting tapered teeth such as are used in pipe fittings.

What I claim as new is:

1. A thread cutting tool having axially extending lands and screw threading teeth thereon, the teeth on different lands being offset axially relatively to each other and inclined to the angle of a helix corresponding to the thread formed by the tool.

2. A thread cutting tap having axially extending lands and screw threading teeth thereon, the teeth on different lands being offset axially relatively to each other and inclined to the angle of a helix corresponding to the thread formed by the tap.

3. A thread cutting die having axially extending lands and screw threading teeth thereon, the teeth on different lands being offset axially relatively to each other and inclined to the angle of a helix corresponding to the thread formed by the die.

4. A thread cutting tool having axially extending lands having screw threading cutting teeth thereon, the cutting teeth on alternate lands being offset axially relatively to each other, and guiding lands between each pair of cutting lands, the guiding lands having guiding teeth.

5. A thread cutting tap having axially extending lands having screw threading cutting teeth thereon, the cutting teeth on alternate lands being offset axially relatively to each other, and guiding lands between each pair of cutting lands, the guiding lands having guiding teeth.

6. A thread cutting die having axially extending lands having screw threading cutting teeth thereon, the cutting teeth on alternate lands being offset axially relatively to each other, and guiding lands between each pair of cutting lands, the guiding lands having guiding teeth.

7. A thread cutting tool having axially extending lands and screw threading teeth thereon, the teeth on different lands being offset axially relatively to each other and inclined to an angle of a helix corresponding to the thread formed by the tool, and guide lands for each cutting land, the guiding lands having guiding teeth.

8. A thread cutting tap having axially extending lands and screw threading teeth thereon, the teeth on different lands being offset axially relatively to each other and inclined to an angle of a helix corresponding to the thread formed by the tool, and guide lands for each cutting land, the guiding lands having guiding teeth.

9. A thread cutting die having axially extending lands and screw threading teeth thereon, the teeth on different lands being offset axially relatively to each other and inclined to an angle of a helix corresponding to the thread formed by the tool, and guide lands for each cutting land, the guiding lands having guiding teeth.

THORVALD PETERSEN.